United States Patent
Brazier et al.

(12) 
(10) Patent No.: US 6,321,771 B1
(45) Date of Patent: Nov. 27, 2001

(54) PRESSURE RELIEF DEVICE FOR A SEALED SYSTEM

(75) Inventors: Geof Brazier, Tulsa; Greg Klein, Owasso; John Nguyen, Tulsa, all of OK (US)

(73) Assignee: BS&B Safety Systems, Inc., Tulsa, OK (US)

( * ) Notice: Subject to any disclaimer, the term of this patent is extended or adjusted under 35 U.S.C. 154(b) by 0 days.

(21) Appl. No.: 09/544,119

(22) Filed: Apr. 6, 2000

(51) Int. Cl.[7] ............................ F16K 17/40; G08B 21/00
(52) U.S. Cl. .................................. 137/68.23; 137/68.18; 137/68.19; 137/68.24; 137/68.29; 200/61.08; 220/89.2
(58) Field of Search ..................... 137/68.18, 68.19, 137/68.23, 68.24, 68.29; 200/61.08, 81 R; 220/89.2

(56) References Cited

U.S. PATENT DOCUMENTS

| | | |
|---|---|---|
| 3,109,554 | 11/1963 | Porter et al. . |
| 3,834,580 | 9/1974 | Ludwig et al. . |
| 4,269,214 | 5/1981 | Forsythe et al. . |
| 4,301,938 | * 11/1981 | Wood et al. ..................... 137/68.29 |
| 4,352,437 | * 10/1982 | Bernatt ........................... 137/68.18 |
| 4,364,487 | * 12/1982 | Drumare ......................... 137/68.29 |
| 4,404,982 | 9/1983 | Ou . |
| 4,479,587 | 10/1984 | Mundt et al. . |
| 4,597,505 | 7/1986 | Mozley et al. . |
| 4,657,157 | * 4/1987 | Short, III ........................ 137/68.29 |
| 5,002,085 | 3/1991 | FitzGerald . |
| 5,005,722 | 4/1991 | Short, III et al. . |
| 5,050,630 | 9/1991 | Farwell et al. . |
| 5,080,124 | 1/1992 | McGregor et al. . |
| 5,082,133 | 1/1992 | Farwell et al. . |
| 5,167,337 | 12/1992 | Short, III et al. . |
| 5,313,194 | * 5/1994 | Varos ............................. 137/68.19 |
| 5,368,180 | 11/1994 | Farwell et al. . |
| 5,583,490 | * 12/1996 | Santos et al. .................. 137/68.18 |
| 5,601,109 | * 2/1997 | Muddiman ..................... 137/68.18 |

FOREIGN PATENT DOCUMENTS 2 146 074 A   4/1985   (GB) .

* cited by examiner

Primary Examiner—Michael Powell Buiz
Assistant Examiner—Ramesh Krishnamurthy
(74) Attorney, Agent, or Firm—Finnegan, Henderson, Farabow, Garrett & Dunner, L.L.P.

(57) ABSTRACT

A pressure relief device for a sealed system is provided. The device includes a negative pressure support that is engageable with the system. A seal is disposed between the support and the system such that a negative pressure differential created in the system acts on the seal to move the seal away from the negative pressure support. A wire connects the seal to the support. The wire is configured to break, thereby releasing the seal, when the seal is exposed to a negative pressure differential having a predetermined level. The device may also include a positive pressure support disposed between the seal and the negative pressure support. The positive pressure support prevents the seal from releasing until the system experiences a positive pressure differential of a predetermined level. The device may also include a sensor that indicates when the seal has released.

26 Claims, 5 Drawing Sheets

PRESSURE RELIEF DEVICE FOR A SEALED SYSTEM

BACKGROUND OF THE INVENTION

This invention generally relates to safety devices for pressurized systems and storage systems typically maintained at or near atmospheric pressure. More particularly, the present invention relates to a pressure relief device for a sealed system.

There are many industries in which it is desirable to design and build systems to hold or process a pressurized fluid. To ensure the safety of these types of systems, each such system typically includes a safety device designed to prevent the over-pressurization of the system. In an emergency situation, such as a fire, where the pressure in the system endangers the physical integrity of the system, the safety device will create an opening to provide a vent path to correct the over-pressurization within the system. The opening allows fluid to vent from the system to the environment, or to a safety reservoir, to reduce the pressure in the system and prevent the system from failing under the pressure of the fluid.

In some industries, such as the food processing industry, it is also expected that systems, which require protection from over-pressure situations, may also be exposed to under-pressure, or vacuum, situations. In certain systems, any vacuum within the system can damage sensitive equipment. In the food & drug processing industries, for example, a vacuum may be created in a system when the system is being cleaned after a completion of a process. Typically, these food processing systems are cleaned and/or sterilized with a steam spray apparatus that removes any product from the system after a processing operation is completed and before the next processing step begins. If the system is not properly controlled during steam cleaning, a sudden vacuum can be developed, which may cause damage to the system. For example, if cold water were introduced to the system while steam cleaning, the steam would condense, thereby creating a vacuum situation.

Thus, to completely protect such a system, the pressure release device must provide two-directional pressure relief. The first direction of pressure relief prevents damage or safety hazards resulting from an over-pressurization, or a positive pressure differential situation. The second direction of pressure relief prevents damage or safety hazards resulting from under-pressurization, or a negative pressure differential situation. Since the design of pressure systems and atmospheric storage systems typically produce a design strength that is much higher in a positive pressure differential than a negative pressure differential, an appropriate two-directional pressure relief device must have the ability to function at pressures that vary significantly in each direction.

It should be noted that some systems are unlikely to encounter an over-pressure situation and, thus, the only risk is exposure to a negative pressure differential. In these types of systems, a pressure relief device need only protect the system from a negative pressure differential.

Some systems require pressure protection at very low levels, measured in "inches of water column" rather than "pounds per square inch." Protection may be required in both over-pressure and under-pressure directions, or just in one direction.

A typical two direction pressure relief device includes a sealing member that is sealingly engaged with the system. The sealing member is surrounded by a pair of support members. One support member is configured to permit the seal to release when the seal is exposed to a predetermined positive pressure differential and the other sealing member is configured to permit the seal to release when the seal is exposed to a predetermined negative pressure differential. To provide protection from a negative pressure differential only, the positive pressure support member may be omitted.

The positive pressure support member provides a backdrop for the sealing member and is configured to withstand a predetermined force. As the pressure in the system rises, the seal moves against the positive pressure support. When the pressure reaches a predetermined level, the positive pressure support releases the seal to create a vent path and reduce the pressure in the system. Typically, the positive pressure support member is a generally solid unit that has a series of holes and slits or perforations. The holes allow fluid to enter the system if the seal releases under a negative pressure differential and the slits allow the support member to open when the positive pressure differential reaches a predetermined level. However, in low pressure applications, the positive pressure support does not always fully open, which results in an obstructed flow path for the venting fluid.

The negative pressure support, often referred to as a "girdle," is typically disposed between the system and the seal. When a light negative pressure differential acts on the seal, the seal moves towards the system and into contact with the girdle. The girdle is configured to flex as the seal is pushed against the girdle by the negative pressure differential. This flexing begins at a predetermined pressure level. In most cases, however, the force of the vacuum on the seal and girdle arrangement will not open the seal. Thus, a knife blade is often positioned to puncture the seal as the girdle and seal flex under the vacuum to ensure that the seal fully opens. The positive pressure support does not open under these conditions, which restricts the flow path for the venting fluid to typically 50% of the pressure relief device nominal cross sectional area.

These types of bidirectional pressure relief devices are not conducive to industries, such as the food & drug industry, that require a sanitary environment for processing operations. The girdle, which is positioned between the seal and the system, tends to pick up product during system operation. The configuration of the systems and the pressure relief devices make it difficult to clean the girdle, especially the space between the seal and the girdle, which may ultimately lead to contamination and/or a spoiled product.

The same girdle and seal combination is typically used to provide a single direction low pressure relief device for either positive or vacuum relief.

It is also desirable to include a sensor in the pressure relief devices to indicate when the seal has opened. Typically, the sensor is integrated with the seal and consists of a wire connection that extends across the seal. In theory, when the seal opens, the wire connection will be broken and will indicate that the seal is open. In operation, however, the seal does not always fully open and the wire connection is not always broken. Thus, the seal may open without activating the sensor. For low pressure relief devices, the sensor may be of such fragile construction to avoid interference with the set pressure of the device, that the sensor wire can break leading to false signals that the seal is open.

In light of the foregoing, there is a need for a pressure relief device that (1) provides a high flow area for both positive and negative pressure releases; (2) includes a reliable sensor to indicate when the seal has opened; (3) provides a sanitary seal, (4) provides a high-flow area for single direction of operation at low pressures, and (5) provides a two-way device that operates at low pressures in both directions or at widely different set pressures in each direction.

SUMMARY OF THE INVENTION

Accordingly, the present invention is directed to a one-way or a two-way pressure relief device that obviates one or more of the limitations and disadvantages of prior art pressure relief devices. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, the invention is directed to a pressure relief device for a sealed system. The device includes a support that is engageable with the system. A seal is disposed between the support and the system such that a negative pressure differential created in the system acts on the seal to move the seal away from the support. A wire connects the seal to the support and is configured to break, thereby releasing the seal, when the seal is exposed to a negative pressure differential having a predetermined level. A sensor is connected to the wire to indicate when the wire connecting the seal to the support has broken and released the seal from the support.

In another aspect, the invention is directed to a pressure relief device for a sealed system. The device includes a support that is engageable with the system. A seal is disposed between the support and the system such that a negative pressure differential created in the system acts on the seal to move the seal away from the support. A wire connects the seal to the support. The wire is configured to break, thereby releasing the seal, when the seal is exposed to a negative pressure differential having a predetermined level. The support is configured to provide a flow path of at least 60% of the cross-sectional area corresponding to the nominal size of the device when the seal is released.

In yet another aspect, the present invention is directed to a pressure relief device for a sealed system. The device includes a seal that is engageable with the system and is configured to release from the system to create a fluid flowpath. The device also includes a support structure. The support structure prevents the seal from releasing when the seal is exposed to a negative pressure differential until the negative pressure differential reaches a first predetermined level. The support structure also prevents the seal from releasing when the seal is exposed to a positive pressure differential until the positive pressure differential reaches a second predetermined level. The first predetermined level is independent of the second predetermined level.

According to another aspect, the present invention is directed to a pressure relief device for a sealed system. The device includes a support that has a substantially circular flange and three legs. The three legs extend from the flange and connect at a point substantially aligned with the center of the flange. The flange of the support is engageable with the system. A seal is disposed between the support and the system such that a negative pressure differential created in the system acts on the seal to move the seal away from the support. A wire connects the seal to the support at the point where the legs connect. The wire is configured to break, thereby releasing the seal, when the seal is exposed to a negative pressure differential having a predetermined level.

In still another aspect, the present invention is directed to a pressure relief device for a sealed system. The device includes a seal that is engageable with the system and is configured to release from the system to create a fluid flow path. The device further includes a first support having an arched shape and including three legs. The first support is connected to the seal to provide support for the seal when the seal is exposed to a negative pressure differential and is configured to release the seal when the negative pressure differential reaches a first predetermined level. The device also includes a second support disposed for engagement with the seal to provide support foR the seal when the seal is exposed to a positive pressure differential. The second support is configured to release the seal when the positive pressure differential reaches a second predetermined level. At least one of the legs of the first support is configured to separate when the seal releases under a positive pressure differential.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate different embodiments of the present invention and together with the description, serve to explain the principles of the invention. In the drawings.

DETAILED DESCRIPTION

Reference will now be made in detail to the presently preferred embodiments of the present invention, examples of which are illustrated in the accompanying drawings. Wherever possible, the same reference numbers will be used throughout the drawings to refer to the same or like parts. An exemplary embodiment of a pressure relief device of the present invention is shown in FIG. 1 and is designated generally by reference number 20.

In accordance with the present invention, there is provided a pressure relief device for a sealed system. As used herein, the term "sealed system" includes any system that typically uses a pressure relief device, including, for example, systems designed to operate at pressures above atmospheric pressure and storage systems designed to operate at or near atmospheric pressure but may become plugged and, thus, require a pressure relief device. The pressure relief device includes a seal that is engageable with the system. Preferably, the seal is disposed between a pair of safety heads that are, in turn, sealingly engaged with the system. The present invention contemplates, however, that the seal may be may be sealingly engaged with the system in any similar manner, such as, for example, sealing the pressure relief device between a pair of pipe flanges in the system.

Figure 1:
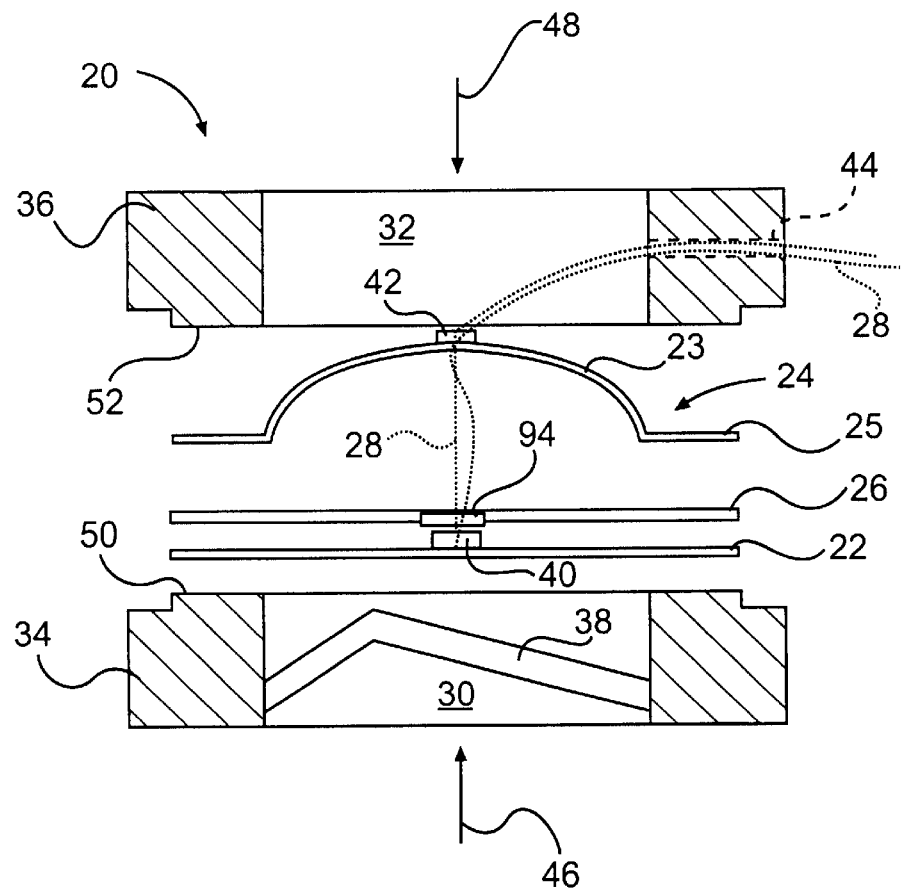
FIG. 1 is a cross sectional view of a two-directional pressure relief device in accordance with the present invention.

As illustrated in FIG. 1, pressure relief device 20 includes a seal 22. Preferably, seal 22 is sealingly engaged between an inlet safety head 34 and an outlet safety head 36. Each safety head 34 and 36 includes a raised surface 50 and 52, respectively, that is configured to engage seal.

Seal 22 may be engaged between safety heads 34 and 36 by a series of bolts (not shown) configured to connect the safety heads together. Alternatively, safety heads 34 and 36 may be disposed between fixtures in the system, such as pipe flanges, which are then connected by bolts or clamps to seal safety heads 34 and 36 and seal 22 therebetween.

Pressure relief device 20 engages the system such that inlet safety head 34 is disposed adjacent the system. Inlet safety head 34 includes a bore 30 that defines a fluid passageway. When pressure relief device 20 is engaged with the system, bore 30 allows the fluid in the system to contact seal 22, thereby exposing the seal to the pressure within the system.

During operation of the system, the system may be exposed to either a positive pressure differential, where the pressure within the system is greater than the ambient pressure (over-pressure), or a negative pressure differential, where the pressure within the system is less than the ambient pressure (vacuum). Preferably, seal 22 is made of a flexible material, such as TEFLON, that responds to the respective pressure situation Thus, when the system is experiencing a negative pressure differential, seal 22 will tend to move towards the system, as indicated by arrow 48. When the system is experiencing a positive pressure differential, seal 22 will tend to move away from the system, as indicated by arrow 46.

The seal is configured to release under either a negative pressure differential or a positive pressure differential. When either pressure differential exceeds a certain level, the material of the seal will tear, or otherwise separate, thereby creating a fluid flowpath through the pressure relief device. In the case of a positive pressure differential, fluid will flow in the direction of arrow 46 through bore 30 of inlet safety head 34 and then through bore 32 of outlet safety head 36 to relieve the over pressure situation. In the case of a negative pressure differential, fluid will flow in the direction of arrow 48 through bore 32 of outlet safety head 36 and then through bore 30 of inlet safety head 34 to relieve the vacuum situation.

In accordance with the present invention, the pressure relief device includes a negative pressure support. The negative pressure support is connected to the seal to prevent the seal from releasing when the seal is exposed to a negative pressure differential until the negative pressure differential reaches a predetermined level. Preferably, a wire connects the negative pressure support to the seal.

It should be noted that the device of the present invention may be connected to the system in a reverse fashion such that a positive pressure differential will cause seal 22 to move in the direction of arrow 48 and a negative pressure differential will cause seal to move in the direction of arrow 46. Thus, the negative pressure support of the preferred embodiment may act to support the seal under a positive pressure differential under these circumstances.

As illustrated in FIG. 1, a negative pressure support 24 is positioned between safety heads 34 and 36. Negative pressure support 24 includes an arched section 23 and a circular flange 25. Preferably, flange 25 is disposed between seal 22 and outlet safety head 36.

Figure 3:
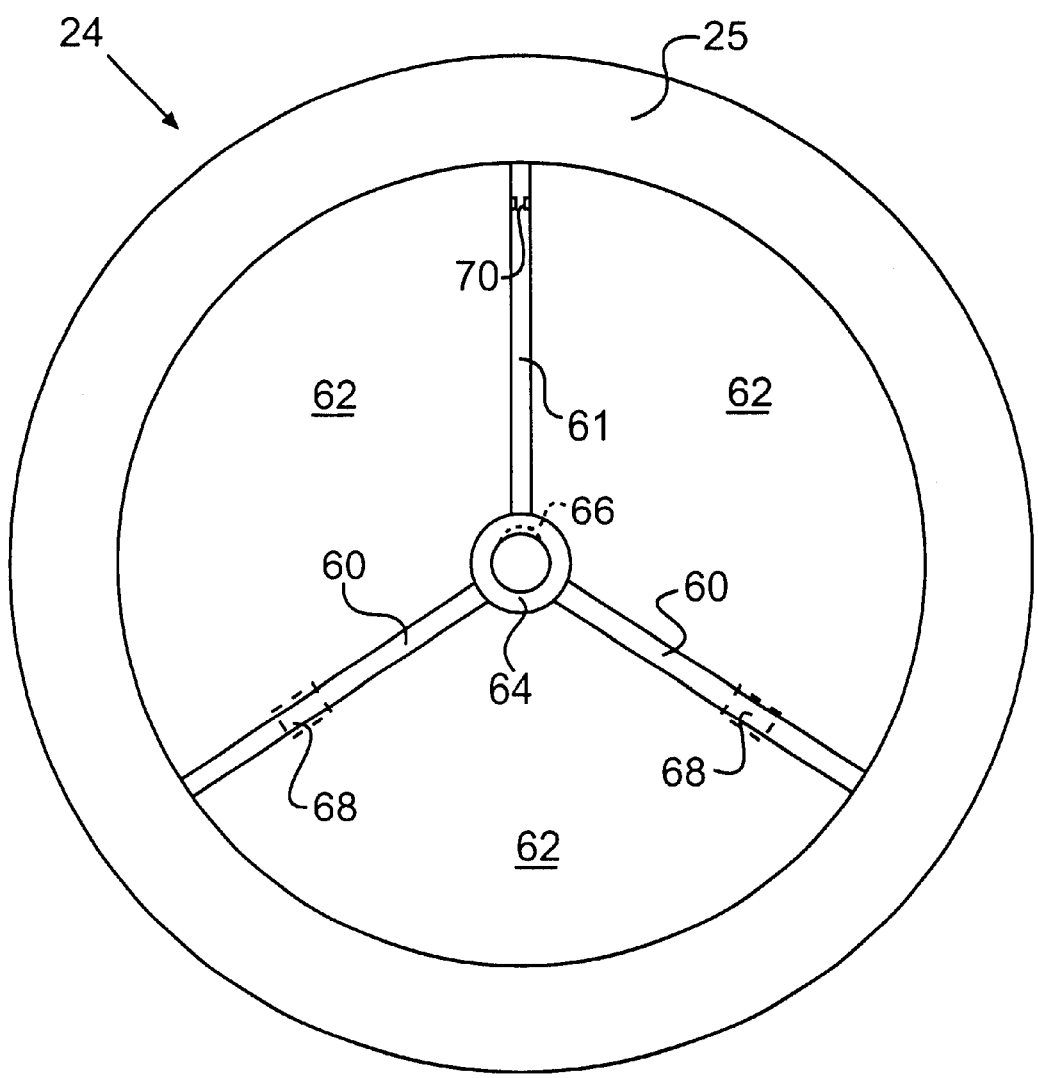
FIG. 3 is a top view of a negative pressure support according to the present invention.

In the embodiment illustrated in FIG. 3, negative pressure support 24 includes three legs 60. Preferably, legs 60 are equally spaced around support 24 and form a generally arched shape. Legs 60 join at a point at the top of the arched section 23 that is substantially aligned with the center of the flange. Preferably, a circular opening 64 is defined at the top of arched section 23.

As also shown in FIG. 1, a wire 28 connects negative pressure support 24 with seal 22. Wire 28 extends from a support button 42 that is engaged with opening 64 in arched section 23 to a seal button 40 disposed on seal 22. Preferably, each button 40 and 42 is made of plastic, although other materials may be used. Each button 40 and 42 is configured to securely hold wire 28 to maintain the connection between seal 22 and support 24.

Wire 28 is configured to break under a predetermined force. When a negative pressure differential is exerted on seal 22, which acts on seal 22 to move seal 22 away from support 24, a corresponding force is transmitted through wire 28 to support 24. When the magnitude of the force reaches the predetermined level, the wire breaks, thereby releasing the seal. The magnitude of the force at which the wire breaks may be adjusted by varying the size and/or material of the wire and the number of wire elements used.

Figure 2:
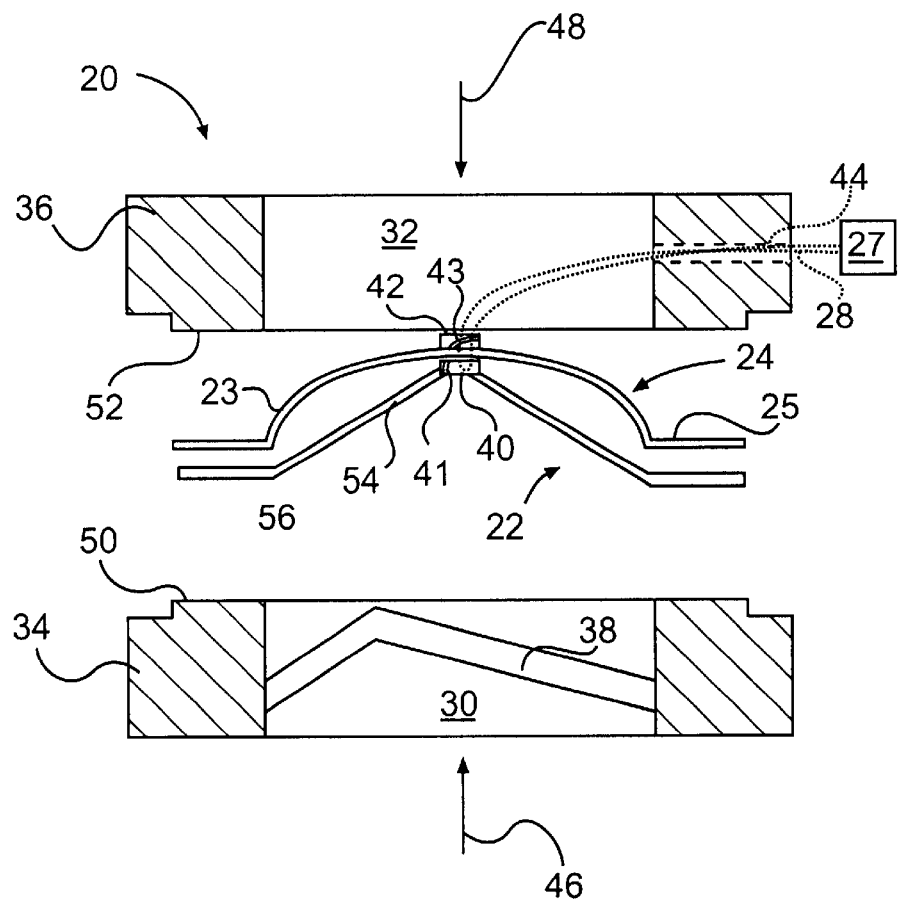
FIG. 2 is a cross sectional view of a one-direction pressure relief device in accordance with the present invention.

As illustrated in FIGS. 1 and 2 a knife blade 38 is preferably positioned in bore 30 of outlet safety head 34. Knife blade 38 includes a point configured to ensure that seal 22 opens fully under a negative pressure differential. Preferably, the knife blade point is offset from seal button 40 to ensure that only seal 22 engages knife blade 38. After wire 28 releases seal 22 in response to a negative pressure differential, seal 22 moves towards bore 30. If material of seal 22 does not tear under the force of the pressure differential, seal 22 will strike knife blade 38, which will puncture seal 22 to ensure that the seal opens to create a vent path.

Figure 1A:
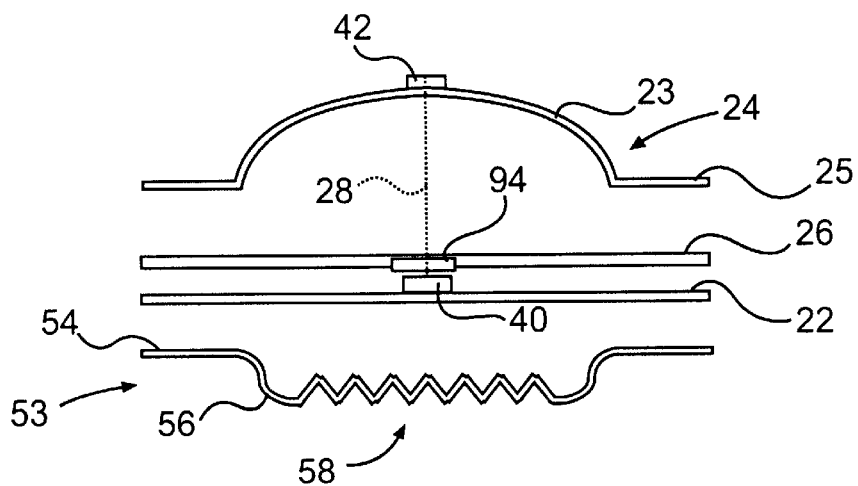
FIG. 1a is a cross sectional view of an alternative embodiment of a two-directional pressure relief device according to the present invention.
Figure 2A:
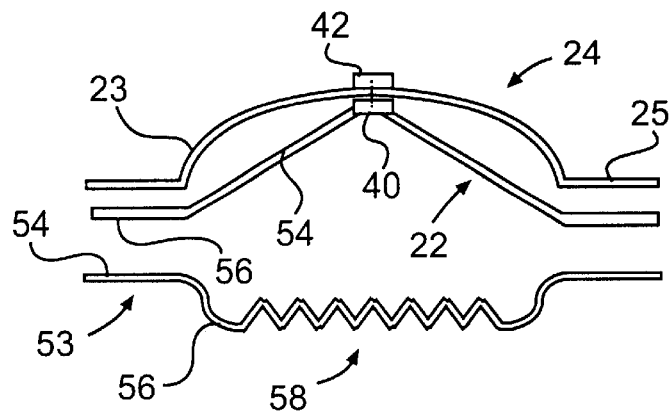
FIG. 2a is a cross sectional view of an alternative embodiment of a one-direction pressure relief device according to the present invention.

Alternatively, as illustrated in FIGS. 1a and 2a, in an embodiment where the pressure relief device is engaged with a system without the use of the safety heads, the pressure relief device may include a separate knife ring 53 to ensure seal 22 opens. Knife ring 53 includes a spacer 56 that extends from a flange 54. Spacer 56 supports a series of teeth 58 that are configured to engage seal 22. Spacer 56 provides room for seal 22 to flex under the pressure differential without engaging teeth 58 until wire 28 breaks to release seal 22.

The present invention contemplates that the wire connection between support 24 may be extended, as illustrated in FIG. 1, such that seal 22 extends directly across bore 30 of inlet safety head 34 and is spaced from support 24. Alternatively, as illustrated in FIG. 2 the wire connection may be shorter, such that seal 22 extends toward and is in closer physical proximity to support 24. The embodiment illustrated in FIG. 2 is the preferred embodiment for a device to relieve a negative pressure differential only, where protection from a positive pressure differential (explained in greater detail below) is not required.

In a pressure relief device for relieving only negative pressure differentials, such as illustrated in FIG. 2, the negative pressure support of the present invention provides for high flow vacuum relief. Preferably, legs 60 and 61 of support 24 are configured to provide a vacuum relief flow area of at least 60% of the cross-sectional area corresponding to the nominal size of the device, compared to typically 50% for prior art relief devices. More preferably, the legs provide a vacuum relief flow area of at least 75% of the cross-sectional area corresponding to the nominal size of the device when the seal is released. Still more preferably, the legs provide a vacuum relief flow area of at least 85% of the cross-sectional area corresponding to the nominal size of the device when the seal is released. In the illustrated embodiment, the domed shape created by the legs has an area that is greater than the cross-sectional area corresponding to the nominal size of the device. Thus, the configuration of the legs in the preferred embodiment allows the flow area to be approximately equal to the cross-sectional area corresponding to the nominal size of the device.

Preferably, wire 28 is configured to make a circuit, such that both ends of wire 28 extend outside of pressure relief device 20. Preferably, a pressure barrier connection 44 is provided in outlet support member 36. The ends of wire 28 exit the pressure relief device 20 through barrier connection 44.

As illustrated in FIG. 3, circular opening 64 that receives button 42 preferably includes a notch 66. Notch 66 is sized to allow wire 28 to return from seal button 40 and extend to pressure barrier 44 without having to transverse seal button 42. In this manner, a single strand of wire 28 provides the support connection between the seal and the negative pressure support.

In the preferred embodiment, wire 28 is connected to a sensor 27 that indicates when the seal has released. Sensor 27 passes an electrical current through wire 28. When wire 28 breaks in response to a negative pressure differential, the current is interrupted. The interruption of the current is used to generate a warning, such as an indicator light, that the seal has broken. The present invention contemplates that the breaking of the wire may generate any type of warning, such as an alarm, or, through a relay, generate a system control signal that could be used to shut down system equipment. The breaking wire sensor stores no electrical energy and can be operated at intrinsically safe power levels as a 'simple device.'

The present invention contemplates that other types of sensors, such as a reed switch, may be integrated into the pressure relief device. To integrate a reed switch sensor in the embodiment illustrated in FIG. 2, a magnet 41 is positioned in seal button 40 and a reed switch 43 is positioned in support button 42. Under normal operating conditions, magnet 41 will hold reed switch 43 in a first position. When wire 28 breaks and seal button 40 and magnet 41 move away from reed switch 43, reed switch 43 moves to a second position, which indicates that the seal has released. The movement of reed switch 43 can therefore be used to generate a warning as described above.

In accordance with the present invention, a positive pressure support is provided. The positive pressure support prevents the seal from releasing until the seal is exposed to a positive pressure differential having a predetermined level. Preferably, the positive pressure support is independent of the negative pressure support.

As illustrated in FIG. 1, a positive pressure support 26 is positioned adjacent seal 22. Preferably, positive pressure support 26 is disposed between seal 22 and negative pressure support 24. In this position, when seal 22 is exposed to a positive pressure differential, seal 22 will contact positive pressure support 24. Positive pressure support will prevent seal 22 from releasing until the positive pressure differential reaches a predetermined level.

Figure 6:
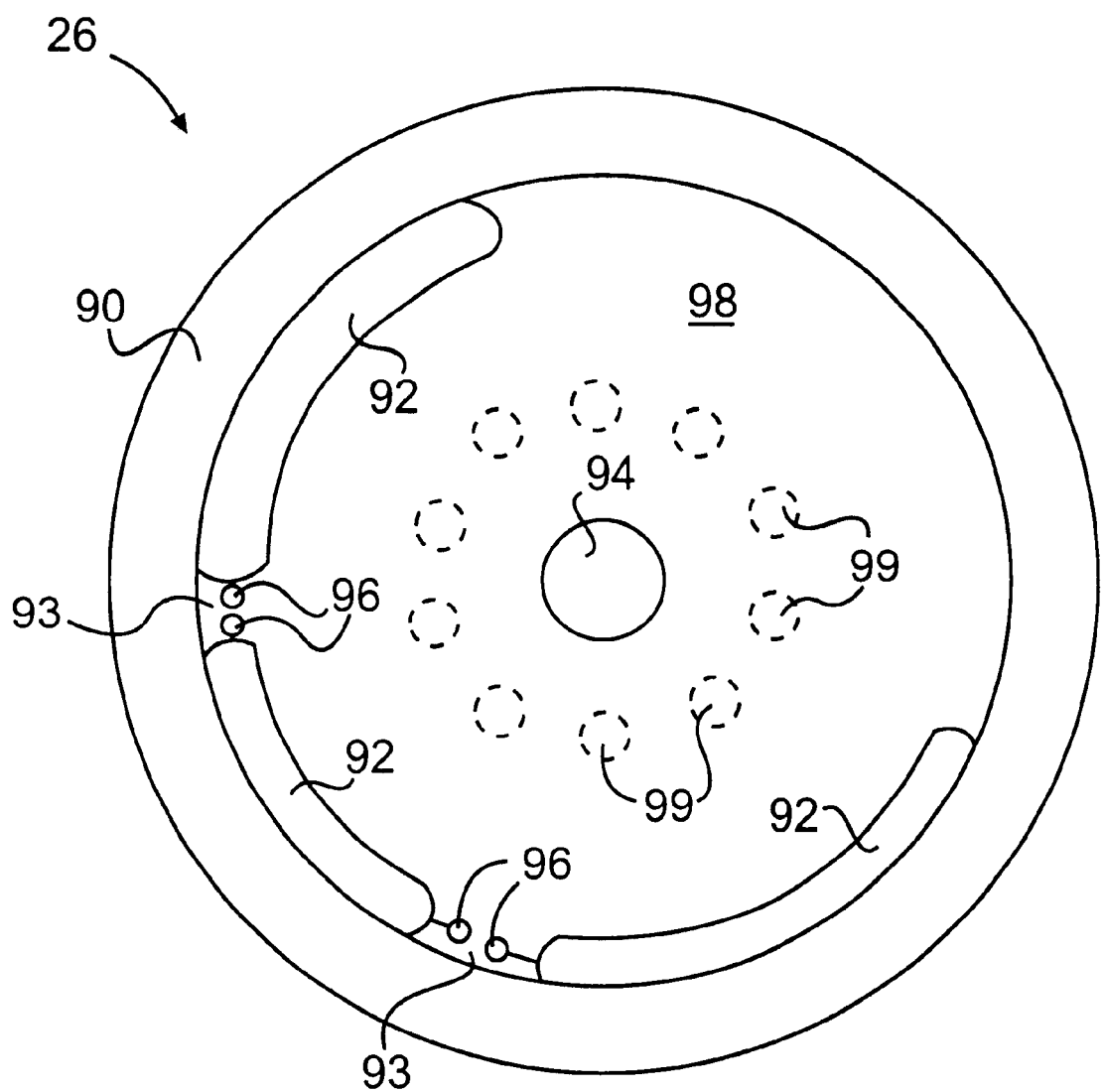
FIG. 6 is a top view of a positive pressure support in accordance with the present invention.

As shown in FIG. 6, positive pressure support 24 includes a body 98 that defines a series of openings 92. Preferably, openings 92 are located along the perimeter of body 98, although it is contemplated that the openings may be positioned elsewhere on the body. A narrow strut 93 of support material is left between openings 92. In the illustrated embodiment, body 98 includes three openings 92 that define two struts 93.

When seal 22 is exposed to a positive pressure differential, the force of the fluid pressure moves seal 22 into contact with body 98 of positive pressure support 26. Body 98 will prevent seal 22 from releasing until the positive pressure differential reaches a predetermined level. When the predetermined pressure level is reached, the material of positive pressure support 26 will tear across struts 93. Body 98 of positive pressure support 26 will then bend in response to the positive pressure and allow the material of seal 22 to tear and create a vent path for fluid to escape the system.

Preferably, openings 92 surround the majority of the perimeter of body 98. Thus, when struts 93 tear to release body 98, the majority of body 98 will be free to bend out of the flow path. In this manner, a large opening is created to vent fluid from the system.

In addition, openings 92 also serve the purpose of allowing fluid to enter the system (in the direction of arrow 48 in FIG. 1) under a negative pressure release. Thus, the larger openings 92 are, the greater the flow rate into the system to relieve a vacuum situation. The present invention also contemplates that additional openings 99 may be disposed in body 98 to provide additional flow area for a negative pressure release.

The size and/or thickness of struts 93, along with the tensile strength of the material of construction of body 98, determines the pressure at which the positive pressure support will release seal 22. As the size and/or thickness of the strut increases, so does the pressure at which the positive pressure support will release the seal. Preferably, each strut 93 includes a pair of holes 96. The size and location of holes 96 is selected to further control the pressure at which the positive pressure support will release the seal.

As illustrated in FIG. 6, positive pressure support 26 includes a central opening 94. Wire 28 connecting negative support 24 to seal 22 passes through central opening 94 (referring to FIG. 1). This configuration allows both the positive and the negative pressure supports to be located on the opposite side of seal 22 from the system. Thus, the positive and negative supports are not exposed to the fluid in the system under normal operating conditions. In a food and drug industry processing application, this configuration will prevent product from becoming lodged in one of the supports. Thus, this configuration provides for a sanitary pressure relief device.

Figure 4:
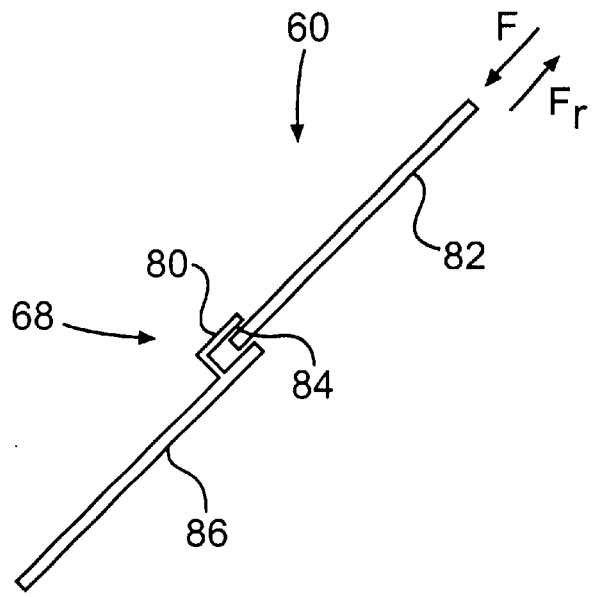
FIG. 4 is a side view of a separable leg joint of a negative pressure support in accordance with the present invention.
Figure 5:
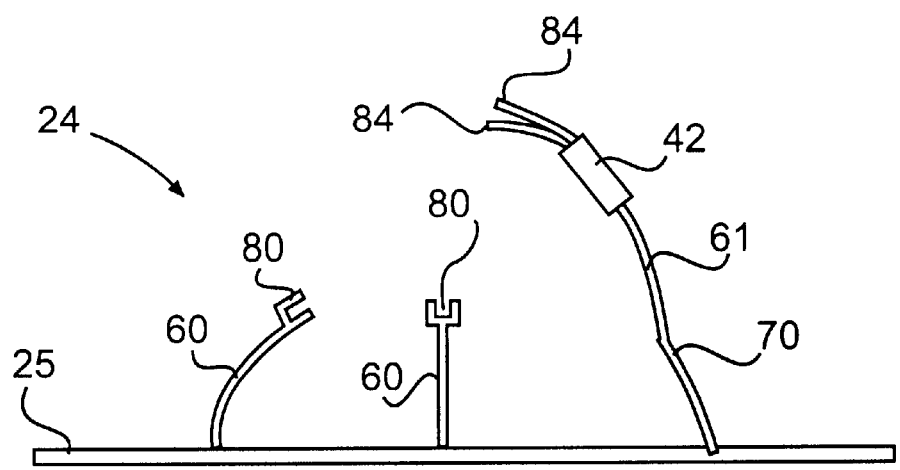
FIG. 5 is a side view of a negative pressure support in accordance with the present invention, illustrating the support in the released position.

Preferably, as illustrated in FIGS. 3 and 4, two legs 60 of support 24 include a separable joint 68. As illustrated in FIG. 4, each leg 60 is separated into an upper segment 82 and a lower segment 86. Joint 68 includes a bracket 80 that is disposed on the upper end of lower segment 86. Bracket 80 slidably receives one end 84 of the upper leg segment 82. Bracket 80 will provide support for upper leg segment 82 when a force (F) acts to compress leg 60, such as would be encountered under a negative pressure differential. If, however, a reverse force, such as would be applied by a released positive pressure support, is applied to upper leg segment 82, bracket 80 will release upper leg segment 82.

As also shown in FIG. 3, the remaining leg 61 preferably includes a pair of notches 70. Notches 70 form a relatively narrower area in leg 60. When a reverse force $F_r$, as would be experienced when seal releases under a positive pressure differential, is exerted on negative pressure support 25, brackets 80 will release two of the three legs 60. As illustrated in FIG. 4, remaining leg 61 of support 24 will bend about notches 70. Thus, button 42 and top portions 82 of legs 61 will move out of the flow path created when the seal releases under a positive pressure differential. In this manner, the area of the flow path is maximized to provide a quick reduction of pressure within the system.

The operation of the aforementioned pressure relief device will now be described with reference to the attached drawings.

In operation, pressure relief device 20 is engaged with a system (not shown). As mentioned previously, the system may be a sealed system and designed to operate at pressures above atmospheric of the system may be a vented system whose ventilation passage has become plugged. Engagement of pressure relief device 20 with the system exposes seal 22 to the pressure of the fluid within the system. Preferably, pressure relief device 20 forms a fluid tight seal with the system to prevent any fluid from leaking into or out of the system.

The system is then operated in its normal fashion. If an emergency situation is encountered and the system experiences an over-pressure situation, the force of the fluid within the system acts on seal 22 to move seal 22 against positive pressure support 26. Body 98 of positive pressure support 26 prevents seal 22 from releasing until the positive pressure differential reaches a predetermined level.

When the predetermined pressure level is reached, the force of the fluid acting on the positive pressure support 26 through seal 22 will overcome the material strength of the positive pressure support. The material in struts 93 of body 98 will tear, thereby allowing the force of the fluid to bend the body away from the system. The material of seal 22 will also tear, creating a vent path for the fluid to escape.

The continued force of the fluid moves seal 22 and body 98 into contact with negative pressure support 24. Legs 60 of negative support 24 release at brackets 80. Negative pressure support 24 bends around notches 70 in remaining leg 61. Thus, the force of the fluid will move seal 22, positive pressure support 26, and negative pressure support 24 out of the fluid flowpath. Thus, a large vent path will be created to quickly reduce the over-pressure situation within the system.

If the system is exposed to a negative pressure differential, the resulting force on seal 22 will act to move the seal away from negative pressure support 24. Wire 28 connecting negative pressure support 24 and seal 22 prevents seal 22 from releasing until a predetermined negative pressure differential is experienced. When the predetermined level is reached, wire 28 breaks, thereby releasing seal 22.

Seal 22 moves away from negative pressure support 24 and into contact with knife blade 38. If the material of seal 22 does not tear initially, contact with knife blade 38 will puncture seal 22 to initiate a tear. The continued force of the negative pressure differential continues to open seal 22 to create a vent path. In a vacuum relief only embodiment, fluid flows between legs 60 and 61 of negative support and through the vent path in the seal to relieve the negative pressure differential. In a bi-directional pressure relief embodiment, fluid flows also flows through openings 92, 94 and 99 in positive pressure support 26 to relieve the vacuum situation.

The pressure relief device of the present invention is therefore a sanitary device, which provides great flexibility in determining the minimum and maximum allowable negative and positive pressure differentials. Because both the positive and negative pressure supports are not exposed to the fluid of the system under normal operating conditions, the relief device does not pose a contamination risk by providing dead space between component surfaces in the system. In addition, the positive pressure support and the negative pressure support are configured to support the seal independently of the other. Thus, the negative pressure differential of the pressure relief device is not dependent upon the positive pressure differential. This allows the pressure relief device of the present invention to be used with any number of systems, including those that are designed to handle a high positive pressure differential but only able to withstand a low negative pressure differential, and those that require a low positive and negative pressure differential.

It will be apparent to those skilled in the art that various modifications and variations can be made in the assembly of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A pressure relief device for a sealed system, comprising:
    a support engageable with the system;
    a flexible seal disposed between the support and the system such that a negative pressure differential created in the system acts on the seal to move the seal away from the support;
    a wire connecting the seal to the support, the wire configured to break and thereby release the seal when the seal is exposed to a negative pressure differential having a predetermined level; and
    a sensor connected to the wire and operable to indicate when the wire connecting the seal to the support has broken and released the seal from the support.

2. The device of claim 1, wherein the support has an arched shape and includes three legs.

3. The device of claim 2, further comprising a button engageable with the support and configured to house the wire.

4. The device of claim 3, further comprising a second button disposed on the seal and configured to house the wire.

5. The device of claim 2, wherein the support is configured to provide a flow path of at least 60% of the cross-sectional area corresponding to the nominal size of the device when the seal is released.

6. The device of claim 1, further comprising a knife disposed adjacent the seal and configured to open the seal when the seal is released.

7. The device of claim 1, further comprising a pair of safety members configured to sealingly engage the support and seal.

8. The device of claim 7, wherein the ends of the wire extend through a pressure barrier connector in one of the safety members.

9. A pressure relief device for a sealed system, comprising:
   a support engageable with the system;
   a flexible seal disposed between the support and the system such that a negative pressure differential created in the system acts on the seal to move the seal away from the support; and
   a wire connecting the seal to the support, the wire configured to break and thereby release the seal when the seal is exposed to a negative pressure differential having a predetermined level, the support configured to provide a flow path of at least 60% of the cross-sectional area corresponding to the nominal size of the device when the seal is released.

10. The device of claim 9, further comprising a sensor connected to the wire and operable to indicate when the wire connecting the seal to the support has broken and the seal is released from the support.

11. The device of claim 10, further comprising a button engageable with the support and configured to house the wire.

12. The device of claim 11, further comprising a second button disposed on the seal and configured to house the wire.

13. The device of claim 9, wherein the support has an arched shape and includes three legs.

14. The device of claim 13, wherein the legs are evenly spaced from each other.

15. The device of claim 9, wherein the flow path is at least 75% of the cross-sectional area corresponding to the nominal size of the device when the seal is released.

16. The device of claim 9, wherein the flow path is at least 85% of the cross-sectional area corresponding to the nominal size of the device when the seal is released.

17. The device of claim 9, wherein the flow path is at least 100% of the cross-sectional area corresponding to the nominal size of the device when the seal is released.

18. The device of claim 9, further comprising a knife disposed adjacent the seal and configured to open the seal when the seal is released.

19. The device of claim 9, further comprising a pair of safety members configured to sealingly engage the support and seal.

20. The device of claim 19, wherein the ends of the wire extend through a pressure barrier connector in one of the safety members.

21. A pressure relief device for a sealed system, comprising:
   a support having a substantially circular flange and three legs, the three legs extending from the flange and connecting at a point substantially aligned with the center of the flange, the flange engageable with the system;
   a seal disposed between the support and the system such that a negative pressure differential created in the system acts on the seal to move the seal away from the support;
   a wire connecting the seal to the support at the point where the legs connect, the wire configured to break and thereby release the seal when the seal is exposed to a negative pressure differential having a predetermined level.

22. The device of claim 21, further comprising a sensor disposed at the connection between the seal and the support, the sensor operable to indicate when the seal has released from the support.

23. The device of claim 22, wherein the sensor includes a magnet disposed on the seal and a reed switch disposed on the support such that movement of the magnet away from the reed switch causes reed switch to move and indicate that the seal has released.

24. The device of claim 23, further comprising a first button disposed on the seal and configured to house the magnet and a second button disposed on the support and configured to house the reed switch.

25. The device of claim 22, wherein the sensor is connected to the wire connecting the seal and support and the breaking of the wire activates the sensor to indicate that the seal has released.

26. The device of claim 21, wherein the legs of the support are configured to provide a flow path of at least 85% of the cross-sectional area corresponding to the nominal size of the device when the seal is released.

* * * * *